Patented Dec. 4, 1923.

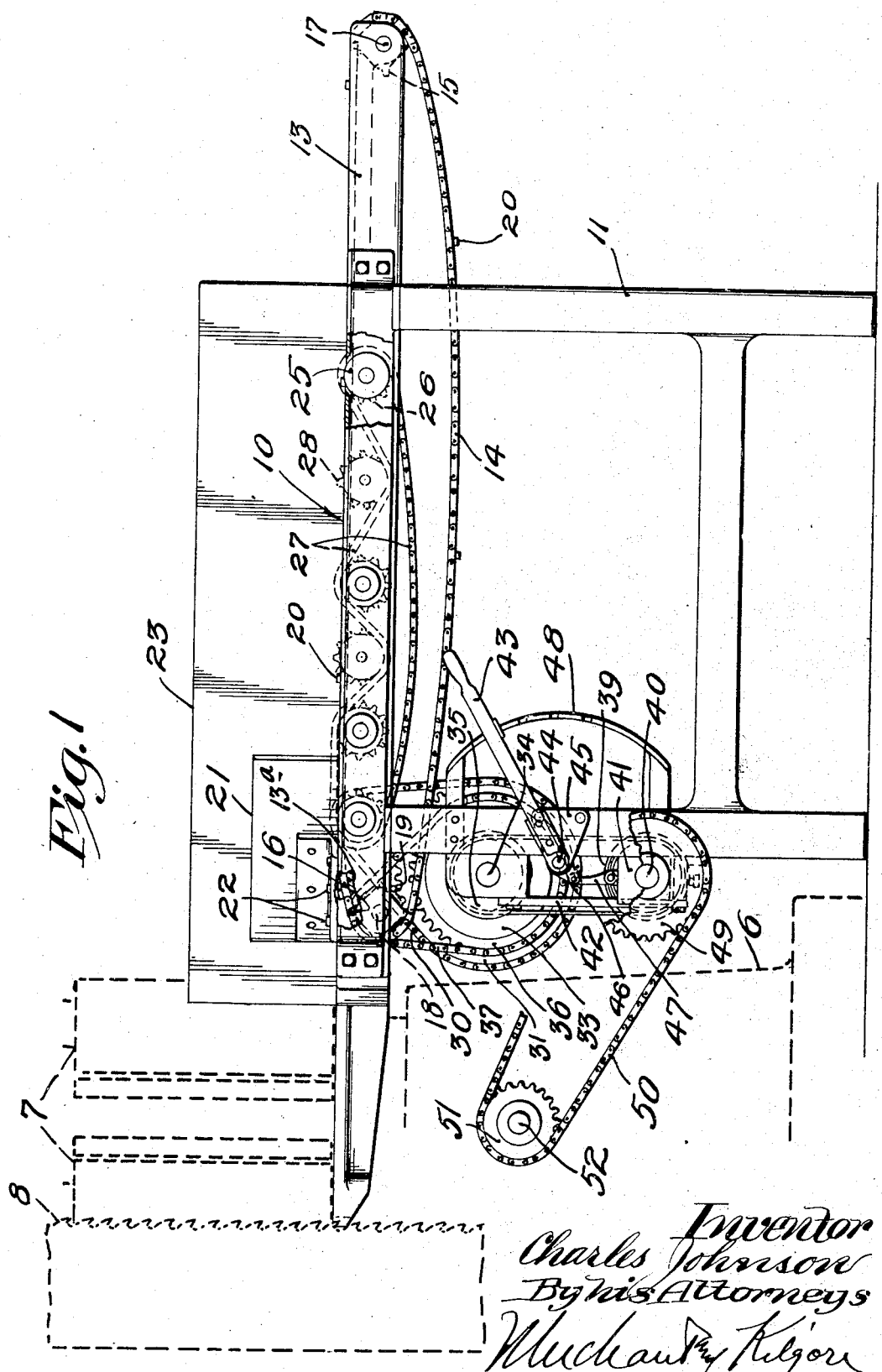

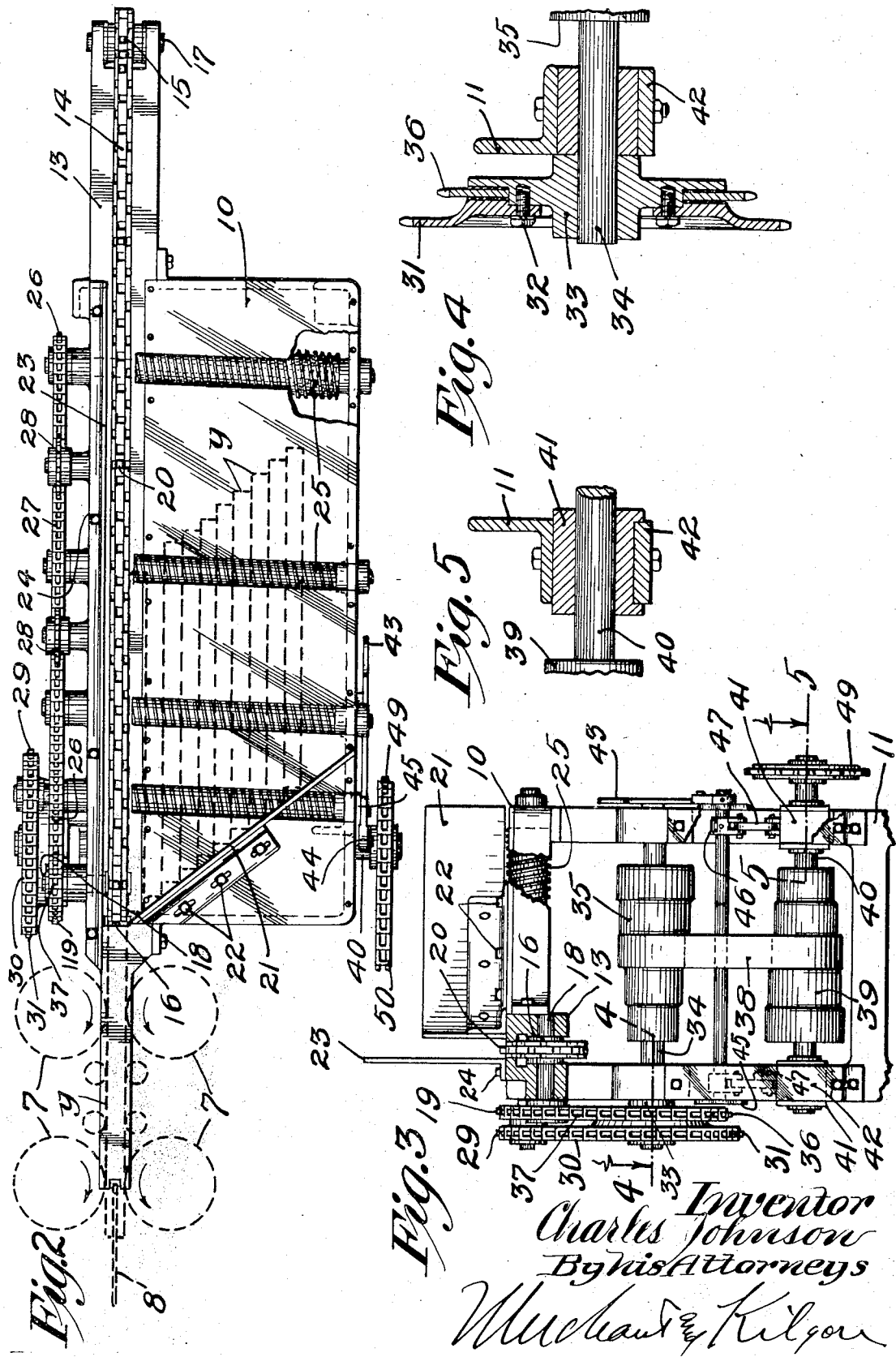

1,475,950

UNITED STATES PATENT OFFICE.

CHARLES JOHNSON, OF MINNEAPOLIS, MINNESOTA.

BOARD-FEEDING DEVICE FOR RESAWS.

Application filed April 5, 1922. Serial No. 549,668.

*To all whom it may concern:*

Be it known that I, CHARLES JOHNSON, a citizen of the United States, residing at Minneapolis, in the county of Hennepin and State of Minnesota, have invented certain new and useful Improvements in Board-Feeding Devices for Resaws; and I do hereby declare the following to be a full, clear, and exact description of the invention, such as will enable others skilled in the art to which it appertains to make and use the same.

My present invention provides an extremely simple and highly efficient board-feeding device especially adapted for use in connection with "vertical resaws" of the type wherein the boards are directly fed to the band saw by co-operating upright feed rollers.

In my improved board-feeding device, the boards to be resawed are placed on a table and, by the action of feed rollers having spiral feeding surfaces, are fed against an oblique deflector and are delivered one at a time to a feed belt or chain, by which latter the boards are delivered to the upright feed rollers and thence to the saw. This arrangement makes it possible to place the boards quite carelessly on the feed table and the feed device will aright and select and properly deliver the boards, one at a time, to the resaw.

In the accompanying drawings, which illustrate the invention, like characters indicate like parts throughout the several views.

Referring to the drawings:

Fig. 1 is a side elevation showing the improved board-feeding device in position for delivery to a vertical resaw, parts only of the latter being indicated by dotted lines;

Fig. 2 is a plan view of the parts shown in Fig. 1, portions being broken away;

Fig. 3 is a front end elevation of the feeding device, some parts being broken away;

Fig. 4 is a detail in horizontal section on the line 4—4 of Fig. 3; and

Fig. 5 is a fragmentary horizontal section on the line 5—5 of Fig. 3.

Of the parts of the vertical resaw, it is only desirable for the purposes of this case to particularly note the frame 6, the upright feed rollers 7 and the band saw 8, said parts being of well known construction, such, for example, as that found in the commercially well known resaw manufactured by the Mereen-Johnson Machine Company, of Minneapolis, Minnesota.

The board-receiving table 10 of the board-feeding device is shown as supported by a leg structure 11. The numeral 13 indicates a horizontal guide rail or beam that is rigidly secured to the leg structure 11 and table 10 with its upper surface flush with the upper surface of the latter but with both rear and front ends projecting. The front end of said guide rail 13 is shown as transversely reduced in width and extended under the lower ends of the co-operating laterally spaced upright feed rollers 7 of the resaw. This rail 13, from its rear end to the front edge of the table 6, is formed with a channel in which works a link belt or sprocket chain 14 that runs over guide sprockets 15 and 16. The sprocket 15 works in the bifurcated rear end of the rail 13 and is journaled thereto by a short shaft 17, while the sprocket 16 is located at the front end of the feed table and is secured to a short countershaft 18 journaled in the rail 13 and provided at its outer end with a driving sprocket 19. Certain of the links of the feed belt 14, at suitably spaced distances apart, are provided with board-feeding lugs 20, which, as they move from the rear sprocket 15 to the front sprocket 16, project above the upper surface of the rail so that they will engage and feed forward a board delivered onto the feed belt. By reference to Fig. 1, it will be noted that the sprocket 16 is set lower than the sprocket 15 and that the channel of the rail 13, at its front extremity, has a downwardly curved surface at 13$^a$ that causes the lugs of the feed belt to lower out of engagement with the board after the board has been forced between the feed rollers 7.

Secured on the table top 10, at the delivery end thereof, is an oblique deflecting bar 21 that is made endwise adjustable by slot and screw connections 22. Secured on the outer side of the rail 13, parallel to the feed belt 14, is a flanged guide plate 23 that is made laterally adjustable by slot and screw connections 24. The front or inner end of the deflecting bar 21 is spaced from the guide plate 23 only far enough to permit one board at a time to be passed between the same by the feed belt and, of course, the adjustments of the said guide plate and bar make it possible to set the same for boards of different thickness.

The boards y are placed edgewise on the table 10 and will assume positions substantially as indicated by dotted lines in Fig. 2. Said table 10 is provided with a plurality of transverse slots through which the upper surfaces of feed rollers 25 project slightly above the upper surface of said table. These feed rollers are provided with spiral threads or corrugations, for an important purpose which will presently appear. The shafts of said rollers are journaled in suitable bearings on the under side of the table 10 and in the rail 13 and, at the rear of the machine, are provided with sprockets 26 over which runs a sprocket chain 27. The sprocket chain 27 also runs under idle guide sprockets 28 journaled to the side of the rail 13. Thus, the several feed rollers 25 are rotated in the same direction, to wit: in a direction to move the boards y forward against the oblique deflecting bar 21 and to cause the threads of said rollers to work the boards laterally toward the feed belt 14 and guide board 23. Of course, the oblique deflecting board 21 cooperates with the threads on the feed rollers to produce the above noted lateral movement of the boards and to press the same, one after the other, to the feed belt. The shaft of the front feed roller 25, outward of its sprocket 26, is provided with another sprocket 29. A sprocket chain 30 runs over the sprocket 29 and over a sprocket 31, which, as shown, is secured by screws 32 to a hub 33 carried by the rear end of a shaft 34 journaled in suitable bearings on the leg structure 11 and provided with a stepped cone pulley 35.

The numeral 36 indicates an annular sprocket that is carried by the hub 33 and is frictionally clamped between the web of the sprocket 31 and an outstanding flange of the hub 33, (see particularly Fig. 4). A sprocket chain 37 runs over the sprocket 36 and the sprocket 19 on the rear end of the feed belt driving shaft 18. By the above means, the rollers 25 are positively driven from the shaft 34, but the feed belt 14 is frictionally driven from said shaft. This frictional or slipping connection makes it feasible to normally drive the feed belt 14 at a speed slightly in excess of the peripheral speed of the feed rollers 7 and so that the boards will be pressed endwise, one against the other, and fed to the saw as a continuous line of lumber. The feed rollers 7 will actually control the speed of delivery of the boards to the saw and when they hold back one board against that being delivered by the feed belt 14, the sprocket 36 will be caused to slip in respect to the hub 33.

In the arrangement illustrated, the countershaft 34 is driven through a belt 38 that runs over the stepped cone pulley 35 and over a reversely stepped cone pulley 39 carried by a lower countershaft 40. This countershaft 40 is journaled in bearings 41 mounted for vertical movements in guides 42 on the leg structure 11 so that the tension on the belt 38 may be varied and the slack thereof always taken up. The bearings 41, as shown, are arranged to be vertically adjusted by a lever 43 secured to the front end of a rock shaft 44 journaled in suitable bearings 45 on the leg structure 11 and having short arms 46 connected to said bearings by short links 47. The lever 43 is adapted to be locked in different positions by engagement with different notches of a latch segment 48 secured on the leg structure 11, as best shown in Figs. 1 and 3.

At its front end, the lower countershaft 40 is provided with a sprocket 49. A sprocket chain 50 runs over said sprocket 49 and over a sprocket 51 carried by one of the power-driven shafts 52, preferably the feed shaft, of the vertical resaw.

The operation of the board-feeding device illustrated is obvious from the foregoing description. The efficiency of the same has been thoroughly demonstrated in practice.

What I claim is:

1. A board-feeding device comprising a table, a feed device movable longitudinally of said table, and a deflecting bar obliquely secured to said table in a position diverging from the receiving portion of said feed device and terminating immediately adjacent to said device, whereby only the board crowded onto said device and carried by said device may be fed beyond said deflecting bar.

2. A board-feeding device comprising a table, a feed belt movable longitudinally of said table, a deflecting bar obliquely secured to said table in a position diverging from the receiving portion of said feed belt and terminating immediately adjacent to said belt, whereby only the board crowded onto said belt and carried by said belt may be fed beyond said deflecting bar, and means associated with said belt for preventing the board delivered thereto from being crowded laterally off from the same.

3. A board-feeding device comprising a table, a feed belt movable longitudinally of said table, a deflecting bar obliquely secured to said table in a position diverging from the receiving portion of said feed belt and terminating immediately adjacent to said belt, whereby only the board crowded onto said belt and carried by said belt may be fed beyond said deflecting bar, and a guide rail secured adjacent and parallel to said feed device on the side thereof opposite to said deflecting bar and operating to prevent a board delivered to said belt from being crowded laterally off from the same.

4. A board-feeding device comprising a table, a feed belt movable longitudinally of said table, a deflecting bar obliquely secured to said table in a position diverging from the receiving portion of said feed belt and terminating immediately adjacent to said belt, whereby only the board crowded onto said belt and carried by said belt may be fed beyond said deflecting bar, and spiral feed rollers associated with said table and driven in a direction to crowd the boards laterally toward said feed belt.

5. A board-feeding device comprising a table, a feed belt movable longitudinally of said table, a deflecting bar obliquely secured to said table in a position diverging from the receiving portion of said feed belt and terminating immediately adjacent to said belt, whereby only the board crowded onto said belt and carried by said belt may be fed beyond said deflecting bar, a guide rail secured adjacent and parallel to said feed device on the side thereof opposite to said deflecting bar and operating to prevent a board delivered to said feed belt from being crowded laterally off from the same, and spiral feed rollers associated with said table and driven in a direction to crowd the boards laterally toward said feed belt and against said guide rail.

6. A board-feeding device comprising a table, a feed belt movable longitudinally of said table, a deflecting bar obliquely secured to said table in a position diverging from the receiving portion of said feed belt and terminating immediately adjacent to said belt, whereby only the board crowded onto said belt and carried by said belt may be fed beyond said deflecting bar, and means associated with said belt for preventing the board delivered thereto from being crowded laterally off from the same, and which deflecting bar is arranged to hold a plurality of boards in compact arrangement set edgewise in vertical planes on said table and to deliver the same one at a time to said feed belt.

In testimony whereof I affix my signature.

CHARLES JOHNSON.